July 14, 1964 L. H. CUTLER 3,140,727
PILOT CONTROLLED VALVE
Filed Dec. 26, 1961 4 Sheets-Sheet 1

Inventor:
Leon H. Cutler
by H. F. Manbeck, Jr.
His Attorney

July 14, 1964

L. H. CUTLER 3,140,727

PILOT CONTROLLED VALVE

Filed Dec. 26, 1961

Inventor:
Leon H. Cutler,
by H.F. Manbeck, Jr.
His Attorney.

July 14, 1964  L. H. CUTLER  3,140,727
PILOT CONTROLLED VALVE
Filed Dec. 26, 1961  4 Sheets-Sheet 4

Inventor:
Leon H. Cutler
by H. F. Manbeck, Jr.
His Attorney

United States Patent Office 3,140,727
Patented July 14, 1964

3,140,727
PILOT CONTROLLED VALVE
Leon H. Cutler, New Haven, Conn., assignor to General
Electric Company, a corporation of New York
Filed Dec. 26, 1961, Ser. No. 162,092
11 Claims. (Cl. 137—606)

My invention relates to pilot controlled, pressure operated valves and more particularly to such valves for use with domestic appliances.

Domestic appliances such as automatic clothes washers customarily include a solenoid actuated valve for controlling the filling of the machine with water. The valves are ordinarily of the mixing valve type and they are arranged so that they will deliver either hot or cold water, or a mixture of both to the machine as selected by the housewife. Pilot controlled, pressure operated diaphragm valves have found wide use for this service, with one of their major advantages being that they require only a small actuating force from the solenoids to provide the valving action. Since each solenoid controls a pilot system, which in turn controls the valving diaphragm, the solenoids may be much smaller and less expensive than if they were to operate the main valve members directly.

In the type of valve which has heretofore been used, the solenoids operate plungers so as to open and close relief apertures in the diaphragms themselves. The opening of the apertures relieves the pressure over the diaphragms allowing them to open, while the closing of the apertures causes a pressure to build up over the diaphragms forcing them to close. A typical valve for appliance applications, which uses this plunger type of control, is shown in the Bochan Patent No. 2,908,285 dated October 13, 1959. But although this plunger type of control ordinarily gives dependable action, it does have certain drawbacks. In the first place, the solenoid must move the plunger through an appreciable distance to allow for diaphragm travel and to maintain the relief aperture open when the diaphragm is in its open position. This requires a greater magnetic force and, thereby, a larger solenoid, than would be needed if the control member only needed to move a short distance. Also, the cylindrical shape of the plunger and plunger housing create a potential drag problem requiring that the solenoid be made large enough to overcome it. Further, the plunger is subject to sticking, particularly if lint, dirt or other foreign particles get between it and the plunger housing, and this sticking may seriously interfere with the proper control of the diaphragm.

Accordingly, it is an object of my invention to provide a new and improved solenoid actuated, pilot type valve which does not employ plungers as the pilot control members.

Another object of my invention is to provide an improved solenoid actuated valve of the pilot controlled type, which is arranged so that only relatively small solenoids are needed to actuate the pilot control members.

A further object of my invention is to provide an improved pilot controlled valve in which the relief openings of the pilot system are contained in the valve parts, rather than in the diaphragms, and the solenoids and the control members are located remotely from the diaphragms.

Still another object of my invention is to provide a low cost solenoid actuated valve for domestic appliances, which is highly reliable in operation and is not subject to sticking or other malfunction in the pilot system.

In carrying out my invention in one form thereof, I provide a pilot controlled, diaphragm valve having a valve body formed of molded plastic material. The valve body includes an inlet, an outlet and a valve seat which is located between them for cooperation with a suitable diaphragm. A chamber is formed in the valve body over the diaphragm, and a bleed aperture is provided for introducing fluid into the chamber from the inlet for closing the diaphragm onto the valve seat. To allow the diaphragm to open, a control passageway is formed in the valve body for releasing the fluid from the chamber. This passageway leads from the chamber to the outlet and when it is open, the pressure behind the diaphragm is relieved so that the pressure in the inlet forces the diaphragm open.

By my invention the control passageway includes, i.e., passes through, a cavity formed in one face of the valve body. This cavity accommodates a magnetic armature which preferably is in the form of a clapper-like element, and the armature is arranged to control the flow out of the cavity and thereby the flow through the control passageway. The armature cooperates with the discharge part of the cavity to control the pilot flow and the discharge port is preferably in the form of a resilient washer to provide the best sealing action with the armature when it is in its closed position. The armature is normally spring biased closed and the spring is preferably in the form of a leaf spring element to mount the armature for easy movement under small actuating forces. The control cavity is closed by a suitable sealing plate and the actuating solenoid for the armature is mounted directly over the cavity. With this arrangement the armature may be small in size, is closely located to the solenoid and only a short travel is required to open the relief port. Thus only a relatively small coil is needed for actuating the pilot and at the same time reliable operation is insured without any problems of plunger sticking or the like.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawings in which:

Figure 1:
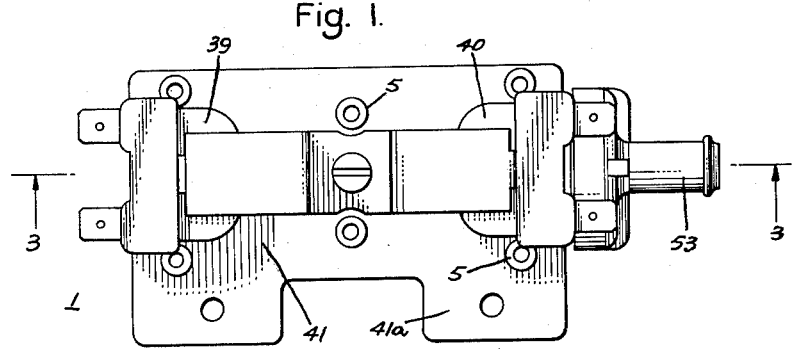
FIG. 1 is a top view of an improved solenoid actuated, pilot controlled valve embodying my invention in one form thereof.
Figure 2:
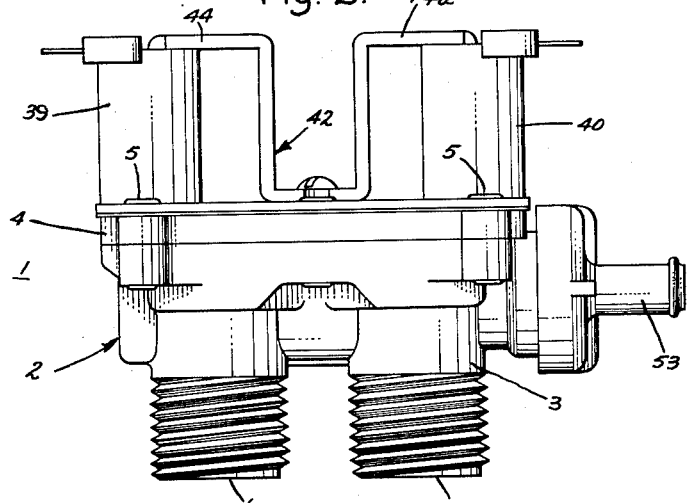
FIG. 2 is a front elevational view of the valve.
Figure 3:
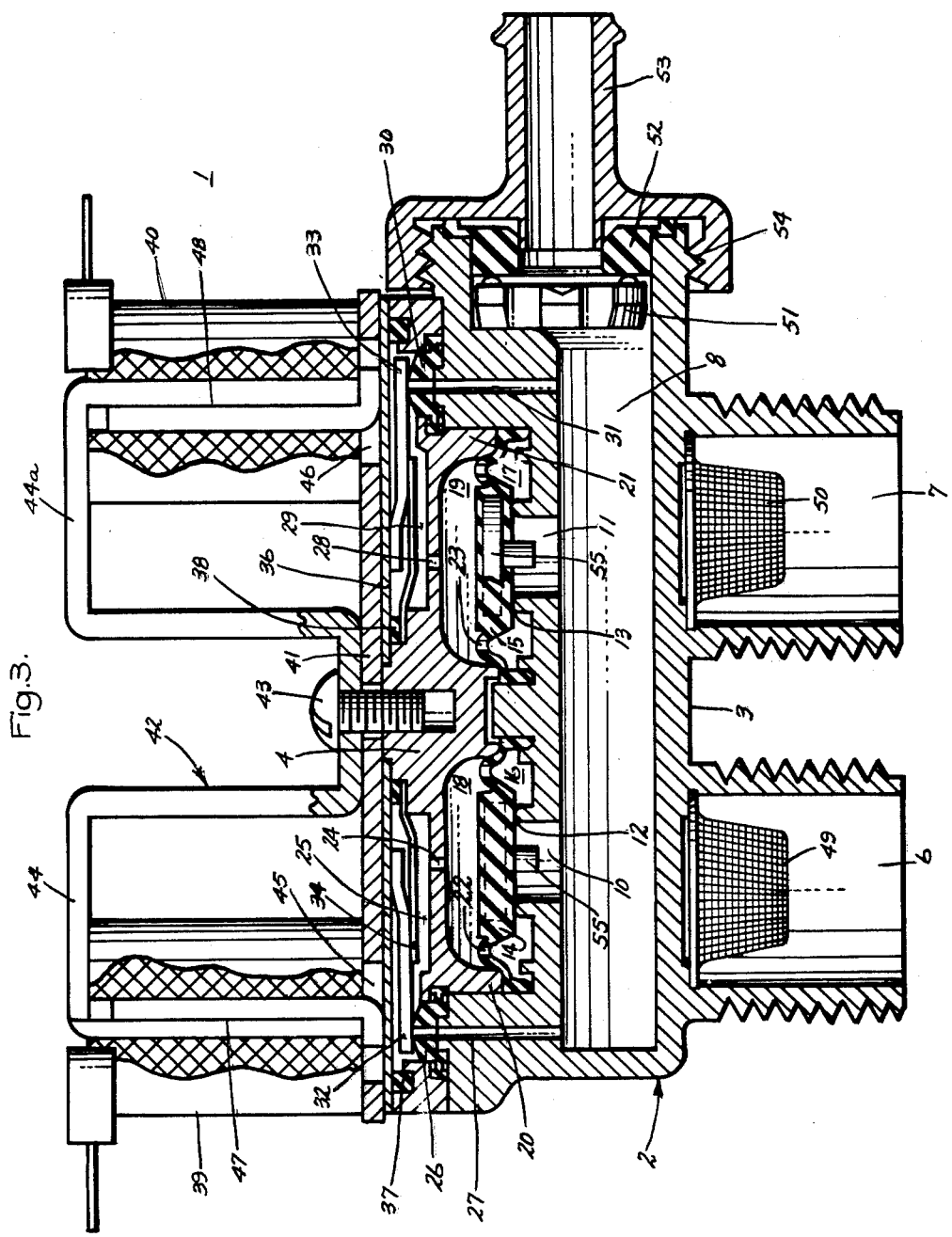
FIG. 3 is a cross-sectional view taken on the line 3—3 of FIG. 1.

Referring now to FIGS. 1–3 of the drawings, I have shown therein a valve 1 which is particularly adapted for use as an inlet and mixing valve in a clothes washing machine. The valve 1 is of the pilot controlled, pressure actuated type and it embodies my invention in one form thereof. The main body or casing 2 of the valve is formed of a pair of molded plastic parts 3 and 4. These parts are arranged in a closely fitting relationship and they are held together by suitable means such as the eyelets 5. The molded parts 3 and 4 may be formed of any suitable material and by way of example I have found that they may be advantageously formed of polymides (nylon).

Figure 5:
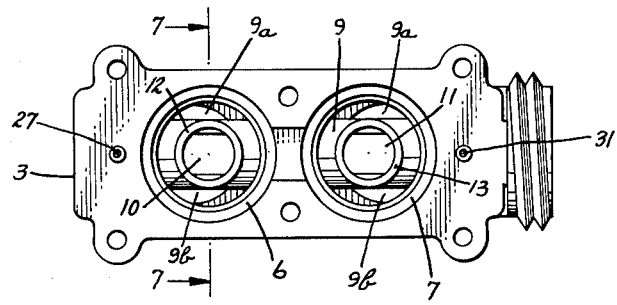
FIG. 5 is a top view of one part of the two part valve body included in the valve.
Figure 6:
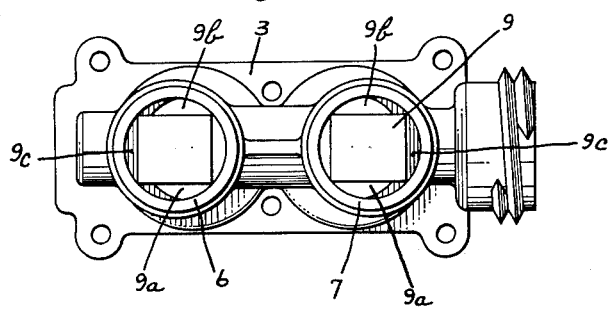
FIG. 6 is a bottom view of same body part shown in FIG. 5.
Figure 7:
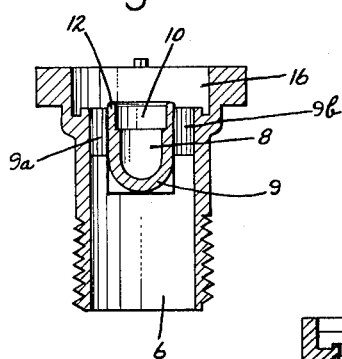
FIG. 7 is a cross-sectional view taken on the line 7—7 of FIG. 5.

The valve 1 includes a pair of laterally spaced inlets 6 and 7 which extend generally parallel to each other. These inlets are formed in the lower body part 3 and also included in that part is a longitudinally extending outlet passageway 8. As is best seen in FIGS. 3, 5 and 7, the outlet passageway 8 comprises a duct, the wall 9 of which is molded integrally with the body 2. The inlets 6 and 7 pass upwardly on either side of the wall 9 as indicated at 9a and 9b in FIG. 7 and also as shown in FIGS. 5 and 6, and the wall 9 is supported in the region between the inlets and at the ends of the valve body. It will be noted that flat sections 9c are formed on the wall 9 over the inlets, the purpose of these flat sections being to provide a seating surface for inlet screens 49 and 50.

In order to provide for the flow of liquid from the inlet into the outlet passageway 8, a pair of ports 10 and 11 are formed in the wall 9 of the duct. These ports, as best seen in FIGS. 3 and 5, include flanges or valve seats 12 and 13 at their upper ends, and diaphragms 14 and 15 are positioned in the valve body so as to cooperate with these valve seats. The inlet passageways 6 and 7 extend upwardly to the spaces around the valve seats and below the diaphragms, indicated at 16 and 17, and when the diaphragms 14 and 15 are lifted off the valve seats, flow may pass freely from the inlets 6 and 7 to the outlet 8. On the other hand when the diaphragms are seated on their respective valve seats, the communication between the inlets and the outlet passageway is sealed off so that no flow can pass through the valve from either inlet.

Figure 9:
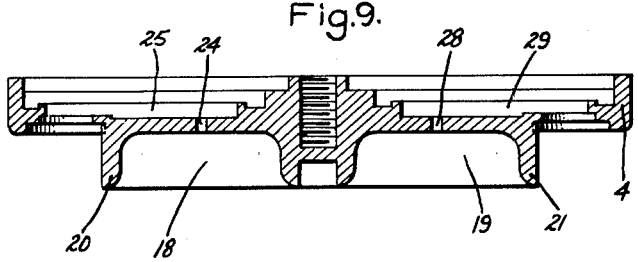
FIG. 9 is a cross-sectional view of the second body part taken on the line 9—9 of FIG. 8.

The diaphragms 14 and 15 are pressure operated and are controlled by means of an improved pilot system provided by my invention. In this pilot system the operating pressures for closing the diaphragm are provided by the chambers 18 and 19 which are formed in the valve body over the diaphragms. Specifically, the chambers 18 and 19 are formed by recesses molded in the body part 4, with depending circular rims 20 and 21 being provided on the part 4 to define the lower portions of the recesses (see FIGS. 3 and 9). It will be noted that the diaphragms 14 and 15 are held between the body parts 3 and 4 at the lower end of the chambers 18 and 19, and specifically the outer edges of the diaphragm are secured between circular rims 20 and 21 and the adjacent surfaces on the part 3 so as to provide a seal between the body parts. No other sealing means are required between the body parts so far as the main flow passages through the valves are concerned. Suitable metal inserts 55 may be provided in the diaphragms for strengthening purposes.

In order to provide a pressure in the chambers 18 and 19 for closing the diaphragms onto the valve seats, each of the diaphragms is provided with suitable bleeder openings such as the openings 22 and 23. These bleeder openings 22 and 23 lead respectively from the spaces 16 and 17 at the upper ends of the inlet passageways into the chambers 18 and 19, and thereby are effective to introduce liquid at substantially the inlet pressure into the chambers 18 and 19. It will be noted that the areas of the diaphragms exposed respectively to the chambers 18 and 19 are greater than the areas exposed to the inlet spaces 16 and 17 and thereby assuming the liquid cannot escape from the chambers 18 and 19, a greater force is applied on the upper side of the diaphragms than on the lower side of the diaphragms (as shown in FIG. 3). Thereby, the liquid or, more exactly, the pressure in the chambers 18 and 19 is effective to close the diaphragms onto the valve seats 12 and 13 and prevent flow through the valve.

In order to open the diaphragms 14 and 15, I have provided improved means for relieving the pressure in the chambers 18 and 19. Specifically, I have provided a passageway for each of these chambers 18 and 19 which leads through the valve parts 3 and 4 to the outlet passageway 8. These passageways, although restricted in size, are capable of passing a greater flow than the bleeder openings 22 and 23 in the diaphragms. Thus, if either of the passageways is opened, it will pass liquid from the chamber 18 or 19 faster than liquid can enter through the bleeders 22 or 23. And thereby the diaphragm closing pressure in the chamber 18 or 19 is quickly reduced to a point where the opening pressure in the space 16 or 17 becomes strong enough to force the associated diaphragm off the valve seat and open the valve. It will be understood, of course, that the control passageways may be opened separately to control either diaphragm or both passageways may be opened at once to release both diaphragms from their seats.

Figure 8:
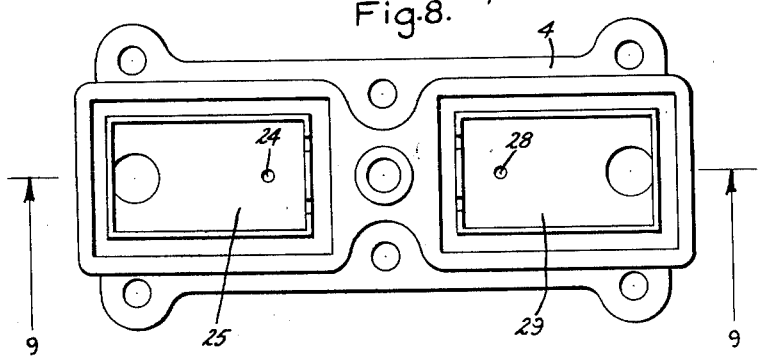
FIG. 8 is a top view of the second part of the valve body.

Taking first the relief passageway for the chamber 18, beginning at the chamber the passageway first extends through an opening 24 which connects the chamber to a cavity or recess 25 formed in the upper face of the valve part 4. (See FIGS. 3, 8 and 9.) From the opening 24 the passageway extends through the cavity 25 from right to left as viewed in FIG. 3 and from there it extends to the outlet duct 8 through the center aperture in a resilient washer 26 and a duct 27 formed in the lower body part. The means for opening and closing this relief or control passageway are positioned in cavity 25 and will be described in detail below. Turning now to the control passageway for the chamber 19, it is the same in arrangement and structure as the passageway for the chamber 18. Specifically, the passageway first extends through an opening 28 in the roof of the chamber 19 into a cavity 29 formed in the upper face of the valve body. The passageway then extends through this cavity from left to right as viewed in FIG. 3 and passes to the outlet 8 through a rubber washer 30 and a duct 31 in the lower body part. It will be noted that the edges of the washers 26 and 30 for the respective passageway are held between the respective body parts 3 and 4 and the flow passes from one body part to another through these washers. In fact the washers 3 and 4 comprise the sole sealing means between the body parts for these passageways and in my entire valve structure no additional seals are required between the body parts 3 and 4 besides these washers and the edges of the diaphragms 14 and 15.

By my invention the flow through each of the relief or pilot passageways is controlled by means of a clapper-like valve element which is disposed within the respective control cavity of the passageway. Specifically, a relatively flat, elongated valve element 32 is positioned in the cavity 25 for controlling the diaphragm 14 and a similar element 33 is positioned in the cavity 29 for controlling the diaphragm 15. These valve elements engage the respective washers 26 and 30 at their one ends and at their other ends they are supported in a cantilever fashion by means of leaf springs 34 and 35. The leaf springs are supported by the valve part 4, specifically being held between it and a cover member 36 at their ends remote from the valve elements, and the springs normally bias the valve elements 32 and 33 into engagement with the washers 26 and 30 so as to close off the flow through the washer elements. Thus the relief or control passageways leading from the chambers 18 and 19 to the outlet 8 are normally closed, and as a result of this sufficient pressure is built up in the chambers 18 and 19 to keep the diaphragms 14 and 15 normally closed on the valve seats 12 and 13. In the illustrated embodiment the valve elements 32 and 33 are flat in the regions where they engage the washers 26 and 30 but if desired a conical projection or stylus tip may be provided on the valve elements 32 and 33. These tips then extend into the openings in the washers to further aid in the sealing action.

It will be noted that the valve elements 32 and 33 are, in effect, pivoted by their respective leaf spring mounting elements and that they need move only a very small distance in order to rise off the washers 26 and 30 and open the pilot passageways.

As mentioned above, the control cavities 25 and 29 are covered by means of a cover plate 36, which is preferably formed of non-magnetic material, and the cover plate is sealed to the valve body by means of rectangular gaskets 37 and 38 located around the rims of the cavities. Mounted above the cover plate 36 are the actuating means for the pilot valve elements 32 and 33, these actuating means comprising magnetic solenoids 39 and 40. Specifically, the solenoid coil 39 is provided for actuating the valve 32 while the solenoid coil 40 is provided for actuating the valve 33. The valve elements 32 and 33 actually comprise magnetic armatures which are attracted by the flux from these coils whenever they are energized, and thus the energization of either of the coils causes its respective valve element or armature to lift off the associated washer 26 or 30 and open the pilot passageway. Specifically, when the coil 39 is energized, the valve element or armature 32 is attracted so that it pivots on the spring 34 opening the hole in the washer 26. This of course allows the chamber 18 to drain and thereby the diaphragm 14 is opened to allow flow to pass from the inlet 6 to the outlet 8. In a similar manner when the coil 40 is energized, the armature 33 is attracted so as to open the relief passageway from the chamber 19. This allows the diaphragm 15 to lift off the valve seat 13 and open communication between the inlet 7 and the outlet 8. If it is desired to pass a mixed flow of hot and cold water, both solenoids may be energized at the same time causing both diaphragms to open, whereby the outlet passageway 8 will also act as a mixing chamber receiving flow from both inlets.

Figure 4:
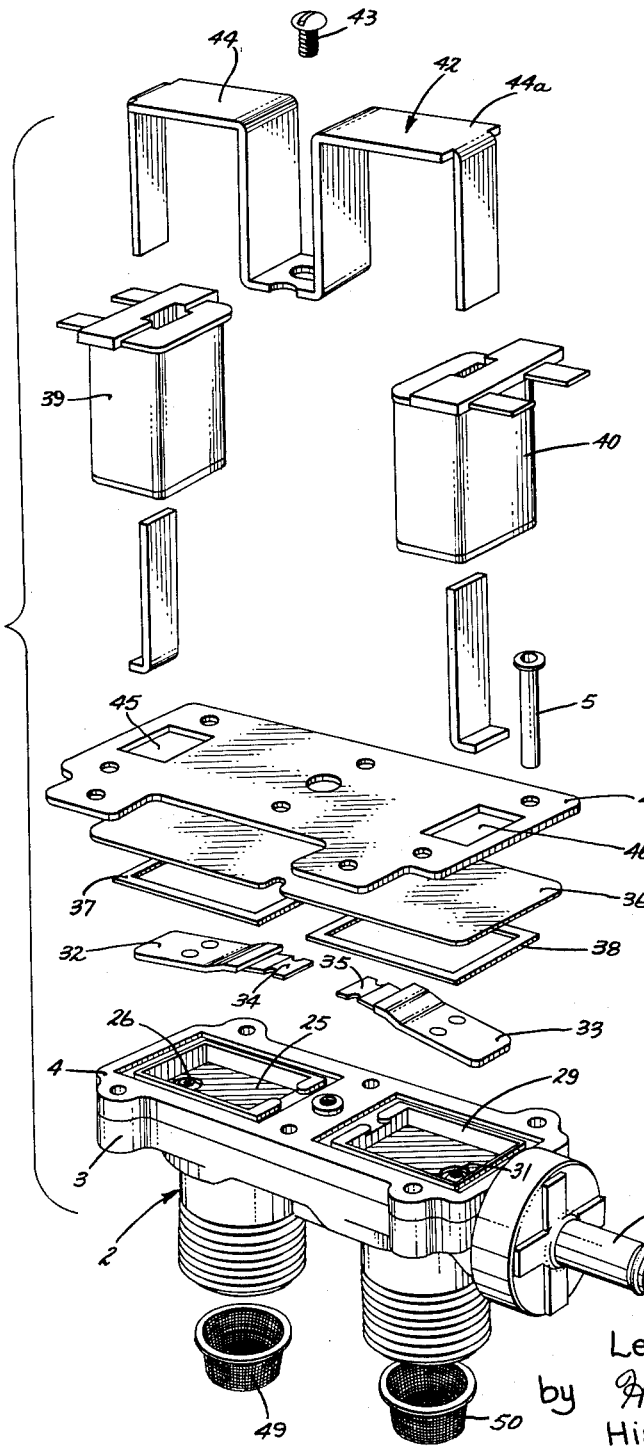
FIG. 4 is an exploded view illustrating the relationship of certain parts of the valve.

It will be noted that the solenoids 39 and 40 are positioned over main mounting plate 41 of the valve, being secured on this mounting plate by means of a double yoke structure 42. The mounting plate 41 is itself attached to the valve body by the same eyelets 5 which secure the body parts 3 and 4 together. The cover plate 36 lies between the mounting plate 41 and the valve body (as shown in FIGS. 3 and 4), and it is held on the body by the mounting plate. A pair of flanges 41a are formed on the mounting plate for attaching it, and thereby the valve 1 as a whole, to the washing machine frame or other supporting structure.

The yoke structure 42 for the solenoids is secured on the plate 41 by means of a screw 43 threaded into the valve body and it includes a left hand U-shaped leg 44 holding the coil 39 and a similar right hand leg 44a holding the coil 40. To provide an efficient magnetic circuit for the coils 39 and 40 and their respective armatures 32 and 33, the mounting plate 41 is provided with apertures 45 and 46 located beneath the coils, these apertures also being located over the outer or operating ends of the armatures or valve elements 32 and 33. The apertures 45 and 46 provide for close coupling between the coils and the armatures in that they allow the magnetic center legs 47 and 48 of the coils to be extended down to the non-magnetic cover plate 36. This reduces to a minimum the gaps between the center legs and the aramtures and thereby gives close coupling between the coils and the armatures. It will be noted that the center legs 47 and 48 are formed by the outer portions of the yoke legs and by cooperating L-shaped inserts fitted against them. The yoke 42, the L-shaped inserts and the plate 41 are all formed of a suitable magnetic material, for example mild steel.

The magnetic flux passing from the coils 39 and 40 through the center legs 47 and 48 to the armatures is returned to the coils by passing through the armatures and thence to the magnetic mounting plate 41. From the mounting plate 41 the flux is returned respectively through the yoke legs 44 and 44a serving as flux return paths. It will be noted that the ends of the armatures which are held by the spring, are offset slightly from the valving ends of the armatures so that the mounting ends are in close proximity or even touching the underside of the cover plate 36. Thus a minimum air gap is provided between the armatures and the mounting plate 41 so as to reduce the gap in the return paths also as far as possible.

From the above it will be seen that I have provided an improved pilot controlled, pressure operated valve in which the pilot valve elements are located remotely from the diaphragms. The pilot valve elements specifically are located in cavities in the one face of the valve body so that they are immediately adjacent to the solenoids for effective magnetic coupling. By reason of the clapper-like operation of the valve elements or armatures, resulting from their elongated configuration and the mounting by means of leaf springs, only a minimum travel is required for them to open the pilot ports for controlling the main valve diaphragms. Thus only a relatively small amount of energy is required for the solenoids to operate the armatures so that minimum size coils can be used. In addition, the magnetic circuit itself is arranged so as to have minimum non-magnetic gaps thereby also enhancing the efficiency of the magnetic system. Further there is no problem of sticking of the valve elements since there are no sliding surfaces involved between the valve elements and the stationary parts. The valve body being formed of molded plastic parts is readily manufacturable and efficient sealing is provided between the parts by the diaphragms and the control washers themselves with no additional sealing means being provided. Another feature of my valve is that the solenoids may be readily removed and replaced merely by loosing the screw 43 and removing the yoke 42. No disassembly of the valve itself is required in order to change solenoids.

It will be noted that in FIG. 3 I have shown suitable strainer elements 49 and 50 positioned in the inlets 6 and 7. It will be understood that these strainer elements are shown by way of illustration only and that any suitable strainer elements or none at all may be used with the valve. In addition a flow control means is shown at the discharge end of the outlet 8. Specifically, this flow control comprises a grooved disk or plate 51 which is positioned over a rubber annulus 52. Depending upon the inlet pressure, the plate 51 is forced more or less strongly against the annulus 52 when there is flow through the valve, and this restricts the flow through the grooves in the plate to a greater or lesser degree. The resultant action provides a generally uniform rate of outlet flow at varying inlet pressures. It will be understood that any suitable flow control means, or none at all, may be used with the valve, and since the flow control does not form part of the present invention, it will not be described in detail herein. A complete description of the illustrated control is, however, given in my co-pending application Serial No. 136,239 filed September 6, 1961 and assigned to present assignee as the present invention. In the illustrated valve, the flow control elements are inserted from the right hand end of the valve body as viewed in FIG. 3 and are held in place by the outlet nozzle 53 which is screwed onto suitable threads 54 provided on the body part 2.

While in accordance with the patent statutes I have described what at present is considered to be the preferred embodiment of my invention, it will be obvious to those skilled in the art that various changes and modifications may be made therein without departing from the invention and it is therefore aimed in the appended claims to cover all such changes and modifications as fall within the true spirit and scope of the invention.

What I claim as new and desire to secure by Letters Patent of the United States is:

1. In a pilot controlled valve having a valve body having a valve seat, an inlet leading to said valve seat, and an outlet leading from said valve seat, a diaphragm supported by said valve body and arranged to engage said valve seat to shut off flow between said inlet and outlet, a chamber formed in said valve body over said diaphragm, a bleed aperture in said diaphragm for introducing fluid into said chamber from said inlet at substantially the inlet pressure for closing said diaphragm onto said valve seat, and a control passageway in said valve body leading from said chamber to said outlet for releasing fluid from said chamber to allow said diaphragm to open, said passageway including a pilot control port therein, the improvement comprising improved means for opening and closing said port thereby to control the operation of said diaphragm relative to said valve seat, said means including a control cavity formed in said valve body, a solenoid coil disposed adjacent to but exterior of said cavity, an elongated clapper-like armature operated by said coil, said armature being disposed in said control cavity and arranged to engage said resilient washer to close said port, and a leaf spring supported at one end by said valve body and supporting said armature at its either end, said armature engaging said port adjacent one end thereof and having an offset section spaced from said port, said offset section being disposed immediately adjacent the roof of said cavity and said spring extending past said offset portion to engage said armature, said spring normally biasing said armature into engagement with said port to close said port, and said coil being arranged to swing said armature off said port upon the energization thereof, thereby to open said port and release the fluid pressure over said diaphragm for opening said valve.

2. In a pilot controlled valve including a valve body having a valve seat, an inlet leading to said valve seat, and an outlet leading from said valve seat, a pressure operated diaphragm arranged to engage said valve seat to shut off the flow between said inlet and outlet, a chamber formed in said valve body over said diaphragm, a bleed for introducing fluid into said chamber from said inlet at substantially the inlet pressure for closing said diaphragm onto said valve seat, a passageway in said valve body leading from said chamber to said outlet for releasing fluid from said chamber to allow said diaphragm to open, said passageway including a pilot control port therein, the improvement comprising improved means for opening and closing said port thereby to control the operation of said diaphragm relative to said valve seat, said means including a control cavity formed in said valve body, a solenoid coil disposed adjacent said cavity, a clapper-like armature operated by said coil, said armature being disposed in said cavity and arranged to close said port, and a leaf spring supported at one end by said valve body and supporting said armature at its other end, said armature engaging said port adjacent one end thereof and having a raised section spaced from said port, said raised section being disposed adjacent the outer wall of said cavity to reduce the non-magnetic gap between said armature and said outer wall, said spring engaging said armature remotely from said port to support said armature for pivotal movement and normally biasing said armature into closing engagement with said port, and said coil being arranged to swing said armature off said port upon the energization thereof, thereby to open said port and release the fluid pressure over said diaphragm for opening said valve.

3. In a pilot controlled valve including a valve body formed of molded plastic and including a valve seat, an inlet leading to said valve seat, and an outlet leading from said valve seat, a diaphragm supported by said valve body and arranged to engage said valve seat to shut off the flow between said inlet and outlet, a chamber formed in said valve body over said diaphragm, a bleed for introducing fluid into said chamber from said inlet at substantially the inlet pressure for closing said diaphragm onto said valve seat, and a passageway in said valve body leading from said chamber to said outlet for releasing fluid from said chamber to allow said diaphragm to open off said valve seat, the improvement comprising an elongated control cavity formed in one face of said valve body and connected to said chamber, a discharge port from said cavity, and a straight-line duct extending from said port to said outlet, said elongated control cavity, said port and said straight-line duct together forming said passageway, a cover plate for said cavity, and means for opening and closing said discharge port thereby to control the operation of said diaphragm relative to said valve seat, said means including a solenoid coil disposed above said cover plate, an elongated magnetic armature positioned in said cavity for operation by said coil and arranged to engage said port to close said port, and a spring normally biasing said armature to close said port, said coil being arranged to swing said armature off said port upon the energization thereof, thereby to open said port and release the fluid pressure over said diaphragm for opening said valve.

4. The improvement of claim 3 where said armature is a clapper-like member and said spring is a leaf spring member, said spring being supported by said valve body at its one end and supporting said armature at its other end, said armature including a raised section spaced from said port and disposed adjacent said cover plate, and said spring extending past said raised portion to engage said armature.

5. In a pilot controlled valve including a molded plastic valve body including a valve seat, an inlet leading to said valve seat, and an outlet leading from said valve seat, a diaphragm supported by said valve body and arranged to engage said valve seat to shut off the flow between said inlet and outlet, a chamber formed in said valve body over said diaphragm, a bleed aperture in said diaphragm for introducing fluid into said chamber from said inlet at substantially the inlet pressure for closing said diaphragm onto said valve seat, and a passageway in said valve body leading from said chamber to said outlet for releasing fluid from said chamber to allow said diaphragm to open, that improvement comprising a control cavity formed in one face of said valve body and a discharge duct leading from said cavity to said outlet, said cavity and said duct being included in said passageway, a solenoid armature positioned in said cavity remote from said diaphragm for opening and closing said duct thereby to control the operation of said diaphragm relative to said valve seat, a non-magnetic plate covering said cavity and sealed to said valve body, and a solenoid assembly mounted above said non-magnetic plate for actuating said armature, said assembly including a coil and a magnetic structure for said coil, said structure including a center leg extending through said coil, a magnetic plate positioned over said non-magnetic plate and a flux return member connecting said magnetic plate to the outer end of said center leg, said magnetic plate having an aperture therein disposed over a portion of said armature, and said center leg extending through said aperture to said non-magnetic plate, whereby a minimum gap is provided for the operating flux linking said coil and said armature.

6. In a pilot controlled valve including a molded plastic valve body and including a valve seat, an inlet leading to said valve seat, and an outlet leading from said valve seat, a diaphragm supported by said valve body and arranged to engage said valve seat to shut off the flow between said inlet and outlet, a chamber formed in said valve body over said diaphragm, a bleed for introducing fluid into said chamber from said inlet at substantially the inlet pressure for closing said diaphragm onto said valve seat, and a passageway in said valve body leading from said chamber to said outlet for releasing fluid from said chamber to allow said diaphragm to open, the improvement comprising a cavity formed in one face of said valve body and a discharge duct leading from said cavity to said outlet, said cavity and said duct being included in said passageway, a solenoid armature positioned in said cavity remote from said diaphragm for opening and closing said duct thereby to control the operation of said diaphragm relative to said valve seat, a thin cover plate positioned over said cavity, and a solenoid assembly mounted over said cover plate for actuating said armature, said assembly including a solenoid coil, a magnetic center leg extending through said coil, and a magnetic frame member overlying said cover plate, said frame member having an aperture therein disposed over a portion of said armature, and said center leg extending through said aperture to said cover plate, thereby to provide a good flux linkage between said coil and said armature.

7. In a mixing valve having a pair of pilot controlled diaphragm valves, a valve body formed of a pair of molded plastic parts, the first of said parts having a pair of inlet passageways and an outlet passageway formed therein, said first part further including a pair of ports arranged to be controlled by said diaphragm valves and respectively connecting said inlet passageways to said outlet passageway, the second of said plastic parts fitting onto said first part and forming separate chambers over said ports, said second part further including a pair of recesses forming control cavities in an outer surface thereof for mounting pilot valve means, said cavities being connected to said chambers through said second part, and said first body part having a pair of ducts leading respectively from said control cavities to said outlet passageway, whereby said body parts provide passages both for fluid mixing and for remote pilot control of said diaphragm valves.

8. In a mixing valve, a valve body formed of a pair of molded plastic parts, the first of said parts having a pair of parallel extending inlet passageways and a transversely extending outlet passageway formed therein; said first part further including a pair of ports respectively connecting said inlet passageways to said outlet passageway, the second of said plastic parts fitting onto said first part and forming separate chambers over said ports, a pair of diaphragms each positioned in one of said chambers for controlling the flow through the associated port, said second part further including a pair of recesses forming control cavities in an outer surface thereof for mounting pilot valve means, said cavities being connected to said chambers through said second part, and said first body part having a pair of straight-line ducts leading respectively and indepedently from said control cavities to said outlet passageways, a pair of resilient washers disposed respectively around the inlet ends of said ducts, and the outer edges of said diaphragms and said washers being secured between the adjacent surfaces of said body parts and forming the sole sealing means between said parts around said ducts.

9. In a valve having a pilot controlled diaphragm valve, a valve body formed of a pair of molded plastic parts, the first of said parts having an inlet passageway and an outlet passageway formed therein; said first part further including a port arranged to be controlled by said diaphragm valve and connecting said inlet passageway to said outlet passageway, the second of said plastic parts fitting onto said first part and forming a chamber over said port, said second part further including a recess forming a control cavity in an outer surface thereof for mounting pilot valve means, a flat cover plate overlying said recess to close said control cavity, an opening in said second part connecting said control cavity to said chamber, and said first part having a straight-line duct leading respectively from said control cavity to said outlet passageway whereby the pilot flow passage for controlling said diaphragm is provided integrally in said molded plastic parts, said control cavity being elongated and extending generally parallel to said outlet passageway between said opening in said second part and said straight-line duct.

10. In a pilot controlled valve, a valve body formed of a pair of molded parts, the first of said parts having an inlet passageway and outlet passageway formed therein, said first part further including a port connecting said inlet passageway to said outlet passageway, the second of said plastic parts fitting onto said first part and forming a chamber over said port, a diaphragm located in said chamber and arranged to engage said port to shut off the flow through said valve, a bleed for introducing fluid into said chamber from said inlet at substantially the inlet pressure for closing said diaphragm onto said port, and means for releasing fluid from said chamber to allow said diaphragm to open comprising a recess forming an elongated control cavity in an outer surface of said second part, an opening in said second part connecting said chamber to said control cavity, a straight-line duct formed in said first part leading from said control cavity to said outlet passageway, and means for opening and closing said duct thereby to control the operation of said diaphragm relative to said port, said means including a solenoid coil disposed over said control cavity, an elongated clapper-like armature disposed in said cavity for operation by said coil and arranged to close said duct, and a leaf spring supported at one end by said valve body and mounting said armature at its other end, said spring normally biasing said armature into closing engagement with said duct, and said coil being arranged to swing said armature off said duct upon energization thereof, thereby to open said duct and release the fluid pressure over said diaphragm for opening said valve.

11. In a pilot controlled valve including a molded plastic valve body having a valve seat, an inlet leading to said valve seat and an outlet leading from said valve seat, a diaphragm supported by said valve body and arranged to engage said valve seat to shut off the flow between said inlet and said outlet, a chamber formed in said valve body over said diaphragm, a bleed for introducing fluid into said chamber from said inlet at substantially the inlet pressure for closing said diaphragm onto said valve seat and a passageway in said valve body leading from said chamber to said outlet for releasing fluid from said chamber to allow said diaphragm to open, the improvement comprising: a cavity formed in one side of said valve body and a discharge duct leading from said cavity to said outlet, said cavity and said duct being included in said passageway, an elongated clapper-like armature disposed in said cavity and engaging said port adjacent one end thereof for closing said duct, a leaf spring supporting said armature adjacent the other end thereof for pivotal movement of said armature, and a solenoid assembly mounted above said cavity for actuating said armature, said assembly including a coil and a magnetic structure for said coil, said structure including a center leg extending through said coil and a flux return member connected to the other end of said center leg, said center leg being located directly over and extending into proximity to the end of said clapper-like armature engaging said port, and the inner end of said flux return member being spaced from said center leg and located toward the other end of said armature whereby when said coil is energized, magnetic flux passes through said armature between said center leg and said flux return member for pivoting said armature at a point spaced from said port.

References Cited in the file of this patent

UNITED STATES PATENTS

| | | |
|---|---|---|
| 1,711,767 | Barden | May 7, 1929 |
| 2,553,769 | Kempton | May 22, 1951 |
| 2,844,768 | Hilgert | July 22, 1958 |
| 2,936,780 | Pratt | May 17, 1960 |
| 2,951,503 | Windsor | Sept. 6, 1960 |
| 2,986,368 | Moore | May 30, 1961 |
| 3,027,498 | Dietiker | Mar. 27, 1962 |
| 3,048,749 | Koehler | Aug. 7, 1962 |

FOREIGN PATENTS

| | | |
|---|---|---|
| 6,451 | Germany | of 1879 |
| 12,336 | Great Britain | of 1903 |
| 64,757 | France | June 29, 1955 |
| 914,710 | France | June 24, 1946 |
| 211,070 | Australia | Oct. 23, 1957 |
| 463,475 | Canada | Mar. 7, 1950 |